United States Patent
Piety et al.

(10) Patent No.: US 9,459,176 B2
(45) Date of Patent: Oct. 4, 2016

(54) VOICE CONTROLLED VIBRATION DATA ANALYZER SYSTEMS AND METHODS

(71) Applicant: Azima Holdings, Inc., Woburn, MA (US)

(72) Inventors: Kenneth Ralph Piety, Knoxville, TN (US); K. C. Dahl, Bainbridge Island, WA (US)

(73) Assignee: Azima Holdings, Inc., Woburn, MA (US)

( * ) Notice: Subject to any disclaimer, the term of this patent is extended or adjusted under 35 U.S.C. 154(b) by 763 days.

(21) Appl. No.: 13/662,051

(22) Filed: Oct. 26, 2012

(65) Prior Publication Data

US 2014/0122085 A1 May 1, 2014

(51) Int. Cl.
*G10L 15/22* (2006.01)
*G01M 7/00* (2006.01)
*G10L 15/20* (2006.01)

(52) U.S. Cl.
CPC .......... *G01M 7/00* (2013.01); *G10L 2015/223* (2013.01)

(58) Field of Classification Search
CPC ..... G10L 15/20; G10L 15/22; G10L 15/063; G01M 1/00; G01M 1/22; G01M 7/00
USPC ............ 704/233, 251, 275; 73/1.82; 702/56, 702/122, 191
See application file for complete search history.

(56) References Cited

U.S. PATENT DOCUMENTS

| | | | |
|---|---|---|---|
| 4,520,674 A | 6/1985 | Canada et al. | |
| 5,115,406 A | 5/1992 | Zatezalo et al. | |
| 5,345,538 A * | 9/1994 | Narayannan | G10L 15/26 704/270 |
| 5,583,801 A | 12/1996 | Croyle et al. | |
| 5,854,994 A * | 12/1998 | Canada | G01H 1/003 702/56 |
| 5,922,963 A * | 7/1999 | Piety | G01M 13/028 702/183 |
| 5,991,726 A | 11/1999 | Immarco et al. | |
| 6,006,164 A | 12/1999 | McCarty et al. | |
| 6,078,874 A | 6/2000 | Piety et al. | |
| 6,297,742 B1 | 10/2001 | Canada et al. | |
| 6,343,251 B1 | 1/2002 | Herron et al. | |
| 6,421,571 B1 | 7/2002 | Spriggs et al. | |
| 6,437,692 B1 * | 8/2002 | Petite | G01D 4/004 702/56 |
| 6,549,869 B1 | 4/2003 | Piety et al. | |
| 6,735,549 B2 | 5/2004 | Ridolfo | |
| 6,834,256 B2 | 12/2004 | House et al. | |
| 7,099,749 B2 * | 8/2006 | Voeller | G10L 15/28 704/275 |
| 7,158,919 B2 | 1/2007 | Wright et al. | |
| 7,231,303 B2 * | 6/2007 | Griessler | G01M 13/045 702/56 |

(Continued)

FOREIGN PATENT DOCUMENTS

JP 2008250431 10/2008

*Primary Examiner* — Martin Lerner
(74) *Attorney, Agent, or Firm* — Pitts & Lake, P.C.

(57) ABSTRACT

Embodiments of the present general inventive concept provide a voice controlled vibration data analyzer system, including a vibration sensor to detect vibration data from a machine-under-test, a data acquisition unit to receive the vibration data from the vibration sensor, and a control unit having a user interface to receive manual and audio input from a user, and to communicate information relating to the machine-under-test, the control unit executing commands in response to the manual or audio input to control the data acquisition unit and/or user interface to output an audio or visual message relating to a navigation path of multiple machines to be tested, to collect and process the vibration data, and to receive manual or audio physical observations from the user to characterize collected vibration data.

19 Claims, 13 Drawing Sheets

(56) References Cited

U.S. PATENT DOCUMENTS

| | | | |
|---|---|---|---|
| 7,240,010 B2 | 7/2007 | Papadimitriou et al. | |
| 7,328,130 B2 * | 2/2008 | Wiles | G01M 13/025 702/183 |
| 7,479,876 B2 | 1/2009 | Carle et al. | |
| 7,571,058 B2 * | 8/2009 | Sealing | G01M 5/0033 702/34 |
| 7,676,285 B2 | 3/2010 | Hoyte et al. | |
| 7,689,373 B1 * | 3/2010 | Lane, Jr. | G01M 13/028 702/56 |
| 8,410,931 B2 * | 4/2013 | Petite | G08B 25/009 702/56 |
| 8,793,094 B2 * | 7/2014 | Tam | H04M 1/24 702/56 |
| 9,199,360 B2 * | 12/2015 | Piety | B25B 13/48 |
| 2003/0120493 A1 * | 6/2003 | Gupta | G10L 15/063 704/270.1 |
| 2003/0204371 A1 | 10/2003 | Sciamanna | |
| 2003/0229500 A1 * | 12/2003 | Morris | G10L 15/26 704/275 |
| 2004/0263342 A1 | 12/2004 | Matlock et al. | |
| 2005/0080620 A1 | 4/2005 | Rao et al. | |
| 2005/0155429 A1 * | 7/2005 | Griessler | G01M 13/045 73/593 |
| 2006/0259271 A1 | 11/2006 | House et al. | |
| 2007/0199989 A1 * | 8/2007 | Piety et al. | 235/438 |
| 2007/0200722 A1 * | 8/2007 | Piety et al. | 340/679 |
| 2008/0133244 A1 * | 6/2008 | Bodin | G10L 15/22 704/275 |
| 2008/0278007 A1 * | 11/2008 | Moore | 307/116 |
| 2009/0024359 A1 | 1/2009 | Bibelhausen et al. | |
| 2009/0295561 A1 | 12/2009 | Hu et al. | |
| 2010/0076714 A1 | 3/2010 | Discenzo | |
| 2010/0082272 A1 * | 4/2010 | Lane, Jr. | G01M 15/12 702/56 |
| 2011/0291850 A1 * | 12/2011 | Sun | G01H 1/003 702/56 |
| 2014/0222378 A1 * | 8/2014 | Piety | G05B 23/02 702/183 |

\* cited by examiner

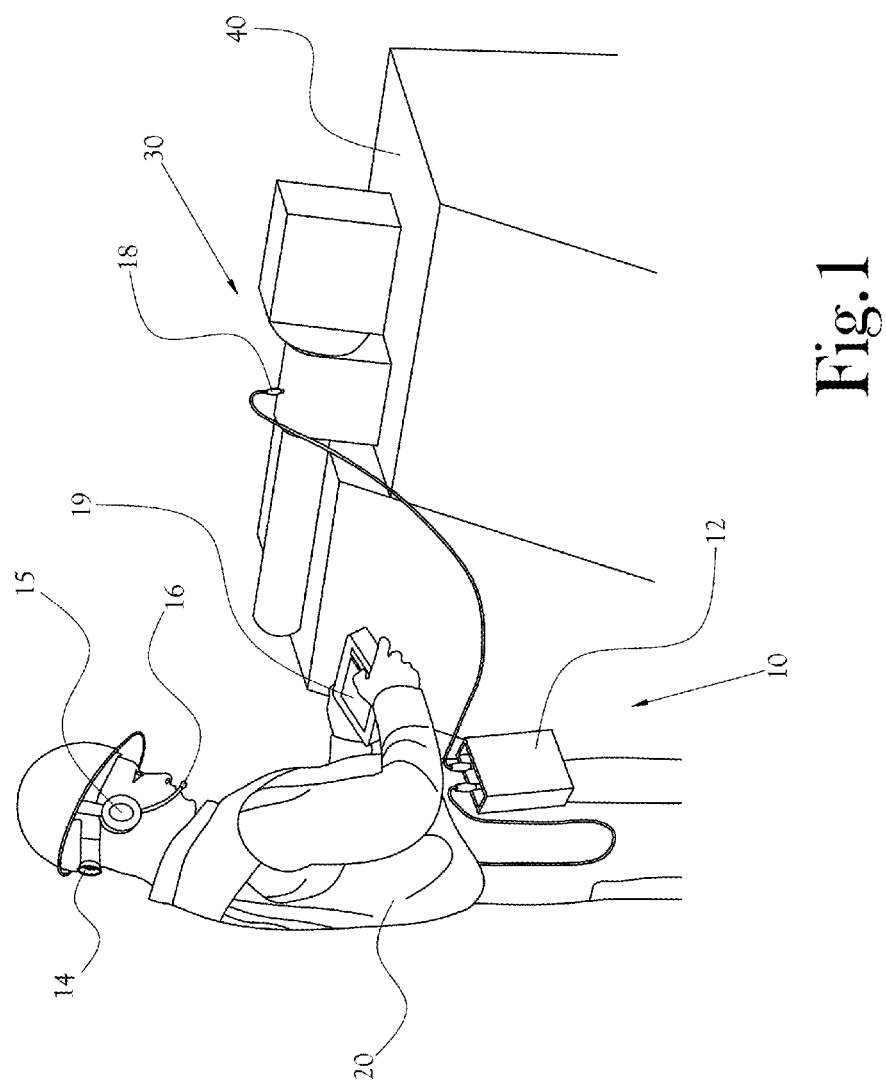

Fig. 8

VOICE CONTROLLED VIBRATION DATA ANALYZER SYSTEMS AND METHODS

FIELD OF INVENTION

The present general inventive concept relates to predictive maintenance programs for industrial applications, and more specifically, to voice-controlled systems and methods to analyze vibration data in predictive maintenance programs for industrial applications.

BACKGROUND

Predictive Maintenance, or PdM, programs in industrial plants are frequently implemented by assigning a technician to use portable instrumentation, such as a vibration analyzer, an ultrasonic gun, and/or an IR camera, along a predetermined route to collect data related to the operation of the equipment on this route. This information, in turn, may then be used to diagnose problems or potential problems associated with the health and/or operation of the equipment.

For example, a PdM program may include a technician or operator (hereinafter "operator") carrying a vibration analyzer device to each machine located along a defined route. Upon reaching a particular machine that is desired to be analyzed, a vibration sensor, such as an accelerometer, is physically coupled to the machine at one or more measurement locations. Frequently, the data to be acquired at each measurement location is specified as part of the route instructions. The vibration sensor and analyzer then acquire vibration data from the measurement locations, and may output this information on a display of the analyzer.

One of the difficulties involved in collecting data in industrial plants relating to vibration and process information for PdM programs is the complexity of freeing the operator's hands to maneuver between pieces of machinery, manipulate one or more sensors, climb and hold rails, look at display, and simultaneously operate a measuring instrument for normal data collection. In many cases, the operator will wear gloves to protect his hands which may also contribute to awkwardness in accurately pressing the buttons to operate the instrument. These difficulties can result in slowing down the data collection process, diminish operator comfort and data collection quality, and introduce additional safety risks.

One solution to enable "hands-free operation" would be the use of voice control and verbal feedback. Although this technology has been applied successfully in many fields, its use in this application has presented several difficulties which have prevented considering it as an option. These difficulties are encountered due to the ambient noise present in PdM environments, and the varying level and frequency of the ambient noise coming from a variety of dynamic sources. In order to limit the impact of false positive recognition events and to provide high recognition accuracy for the correct commands in this environment, special considerations must be given to the design of the user-device interface and to selective adaption and application of speech recognition engine functions. Additionally, the number and the complexity of functions required to perform the data collection tasks presents a challenging design for a speech recognition solution. Finally, one task expected of the operator is to confirm that the data collected is of good quality and to collect additional data in the case that it is suspected that the machine may have fault conditions present. Often this is done by observing the values of measured parameters or scrutinizing the character of graphical presentations of the measured data for unusual characteristics. This aspect of the operator's task is again a challenge to handle using voice feedback without the addition of functions to automatically interpret the data and summarize the findings in a verbal synopsis. Thus, to date no workable solution using speech recognition and feedback has been available for PdM applications.

SUMMARY

Embodiments of the present general inventive concept provide the ability for a technician to operate a portable vibration data analyzer with voice commands. The voice commands can be used to navigate the data analyzer to measurement locations within a set of machines being monitored. In some embodiments, voice control and feedback is achieved using a headset and microphone in communication with the vibration data analyzer.

Embodiments of the present general inventive concept can be achieved by providing a voice controlled vibration data analyzer system, including a vibration sensor to detect vibration data from a machine-under-test, a data acquisition unit to receive the vibration data from the vibration sensor, and a control unit having a user interface to receive manual and audio input from a user, and to communicate information relating to the machine-under-test, the control unit executing commands in response to the manual or audio input to control the data acquisition unit and/or user interface to output an audio or visual message relating to a navigation path of multiple machines to be tested, to collect and process the vibration data, and to receive manual or audio physical observations from the user to characterize collected vibration data.

The control unit can execute commands in response to manual or audio inputs to locate a particular machine and measurement location using navigation controls or identification (ID) tag numbers, to enter or measure a predetermined operational parameter of the machine-under-test, to make predefined routine measurements at a location or perform optional tests, and to log complex field notes even including photographs of the machine-under-test or operating environment thereof.

Embodiments of the present general inventive concept can be achieved by providing a voice controlled vibration data analyzer, including a vibration sensor mountable to various locations of a machine-under-test to detect vibration data, a data acquisition unit to receive the vibration data from the vibration sensor, and a control module having a touch-visual user interface to receive and display information relating to machine conditions, and an audio user interface to receive and communicate information relating to machine conditions such that the control module controls operation of both user interfaces simultaneously to execute commands to be performed by the data acquisition unit in response to an audio input to the audio user interface without a manual input to the touch-visual user interface, to locate a desired machine among multiple machines along a predetermined collection route, to enable predefined and elective modes of data collection, to log results from a user relating to physical observations of the machine-under-test, and to determine whether additional measurements are needed.

The vibration data analyzer or an audio headset can include active noise cancellation techniques to reduce extraneous background noise sources corresponding to various machine testing environments.

Embodiments of the present general inventive concept can also be achieved by providing a field inspection device to perform mechanical health assessments of equipment, including an audio interface to receive verbal input from an operator, including verbal instructions and verbal notations from the operator, a touch interface to receive manual instructions from the operator and a display to present visual information relating to the health of the equipment, a vibration sensor to interact with the equipment in order to gather vibration data relative to the equipment, a control module in electronic communication with the audio interface, visual interface, and vibration sensor, the control module including a speech recognition engine to accept and recognize a voice input supplemented by active background noise cancellation filters of the signal received by the audio interface, a command recognition engine to accept and recognize verbal instructions via the audio interface, the command recognition engine comparing verbal input to a lexicon of known verbal instruction terms and to designate a verbal input as a verbal instruction when the verbal input corresponds to one of the known verbal instruction terms, and a controller engine to control the collection of data, the display of data, the evaluation of the quality of the data and the health of the machine, the communication of data and equipment status, and the selection of operational modes, in response to the verbal instructions. The audio interface also provides verbal feedback related to the function requested as well as the progress and the result from its execution.

Embodiments of the present general inventive concept can also be achieved by providing a method of collecting vibration data from a machine-under-test, including inputting a first verbal command from a user to the control unit to instruct the data acquisition unit to receive vibration data from the vibration sensor, without the user manually touching the control unit, outputting an audio message from the control unit to the user to communicate information relating to the progress of the test measurements, an evaluation of the data collected and the health of the monitored machine, without the user having to visualize the control unit, and inputting additional verbal commands from the user to the control unit to navigate to other locations or machines to be tested, and to record an audible observation from the user about a condition of the machine-under-test.

Additional features and embodiments of the present general inventive concept will be set forth in part in the description which follows and, in part, will be obvious from the description, or may be learned by practice of the present general inventive concept.

BRIEF DESCRIPTION OF THE DRAWINGS

The following example embodiments are representative of example techniques and structures designed to carry out the features of the present general inventive concept, but the present general inventive concept is not limited to these example embodiments. Moreover, in the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIG. 1 illustrates a field inspection device being used by an operator according to an example embodiment of the present general inventive concept;

FIG. 8 illustrates another screen shot of a menu display according to an example embodiment of the present general inventive concept illustrating how field observations can be selected and stored for each machine;

DETAILED DESCRIPTION

Figure 2A:
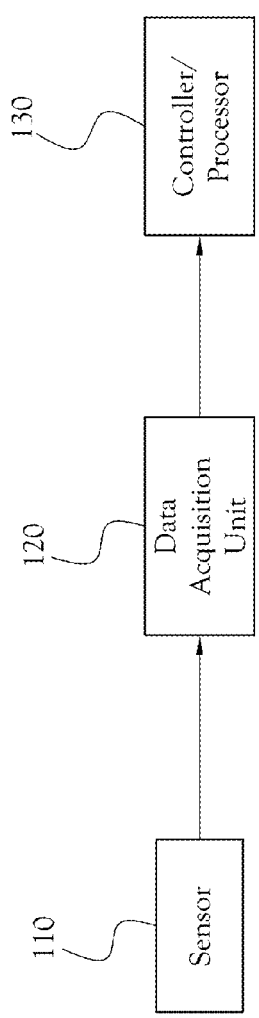
FIG. 2A is a block diagram illustrating a field inspection device according to an example embodiment of the present general inventive concept as a multi-unit instrument.

Reference will now be made to example embodiments of the present general inventive concept, examples of which are illustrated in the accompanying drawings and illustrations. The example embodiments are described herein in order to explain the present general inventive concept by referring to the figures.

It is noted that the following detailed description may recite various descriptive terms such as horizontal, vertical, top, bottom, upward, downward, left, right, etc., when referring to the exemplary figures, but the present general inventive concept is not limited to any such terms or physical orientations. Such terms are used for convenience of description only, and could be reversed, modified, or interchanged without departing from the broader scope and spirit of the present general inventive concept.

Embodiments of the present general inventive concept provide the ability for a technician to operate a portable vibration data analyzer with voice commands. The voice commands can be used to navigate the data analyzer to measurement locations within a set of machines being monitored. In some embodiments, voice control and feedback is achieved using a headset and microphone in communication with the vibration data analyzer. In some embodiments, it is advantageous to use a wireless headset incorporating background noise suppression to provide the hearing protection normally required in industrial facilities. It is also advantageous to select a headset that suppresses external background noise for the microphone input. These types of devices are available commercially from vendors such as Sensear, Peltor, Bose, Tiger Performance, etc.

The user-device interface can control a variety of tasks related to data collection for a particular machine, or a predetermined set of machines, including without limitation, navigating through the machines on a PdM route; acquiring dynamic vibration data at each measurement location, finding machines and measurement locations using identification numbers or a barcode, entering or measuring the machine operational parameters (e.g., RPMs), logging physical observations encountered while collecting data, making voice recording and/or dictating notations of interest, taking photographs of machines or other significant circumstances, reviewing collected data, changing data collection options, entering numerical values of gauge displays or data measured with independent instruments (e.g., an infrared temperature gun), and specifying and collecting special test data.

One of the challenges in the art is to offer "eyes-free operation" in order to allow the operator to focus on the physical challenges of maneuvering himself into position to safely attach a sensor to the equipment and avoid catching dangling cables in the machine. By structuring the routine operations of the system to reduce the number of steps required to navigate and collect data and by providing verbal feedback to identify your current operational state and to identify available commands and to interpret the quality of the data or the existence of fault conditions, the operator does not require visual access to the screen of the controller unit to perform most routine tasks.

Benefits of this technology solution include enhanced speed and accuracy of operating the instrument as compared to a manual-visual mode. The additional auditory feedback to the operator who is typically wearing hearing protection adds an additional confirmation of the function which was initiated in addition to the visual cues. This is especially valuable in hostile environments frequently encountered that may include dim lighting or bright sunlight, high humidity, and heavy dust, smoke, or vapors. This also represents a benefit to operators whose vision may be less than perfect as they view a small screen. Verbal control and feedback of the instrument is faster than pressing keys on the controller, frequently with gloved hands, and then watching for events to occur. As soon as events are finished, verbal feedback alerts the operator whose attention may have shifted to some other activity in his field of view.

Generally, an operator using a field inspection device (hereinafter simply "device") to gather vibration data relating to the performance of a machine will proceed according to a method. In some embodiment methods, an operator will proceed through a plant or industrial site along a predetermined path or "route," visiting designated machines in order. When approaching each machine to be inspected, the operator will gather vibration data from several locations on the machine, generally attaching a sensor to that location and using the sensor to record vibration data for a pre-determined approximate length of time (anywhere from a few seconds to multiple minutes). This process collects a set of vibration measurements at each location on each machine along the operator's route. A device according to the present general inventive concept allows the operator to also record notations, comments, or characterization remarks (hereinafter generally "notations") related to each location on each machine along the operator's route. A program according to the present general inventive concept assembles, for each location, an "assembled data packet" comprising the collected set of vibration data, the notations, and pre-entered identifying data for that location. These "assembled data packets" are taken for analysis by trained analysts, who often perform the analysis at a place far removed from the physical residence of the machine being inspected.

In some embodiments of the present general inventive concept, the control system can include a software module, or program, including a menu system with multiple menu levels, where many menu levels themselves contain nested submenus, with multiple menu options and menu positions, activated by unique voice commands. The control system can receive verbal or manual commands that specify the selection of a specific menu option within each menu level. In some embodiments, at some menu levels, the program responds only to manual commands. In some embodiments, at some menu levels, the program responds both to manual commands and to verbal commands.

Generally, each menu level, and in some instances each submenu within a menu level, has its own selected vocabulary, and terms that would be recognized as verbal commands in one submenu context would not be recognized as verbal commands in a different submenu context. Specific commands can be selected to allow easy recognition by the speech recognition engine, to reduce the possibility of commands being misconstrued due to similar verbal cues. For example, certain terms can be selected to be recognized as verbal commands based on consonant-to-vowel ratios and syllable counts. Further, to avoid confusion, within each selected vocabulary of recognized commands for a menu level or submenu, terms phonetically similar to a term already within the selected vocabulary can be eschewed.

Speech recognition engines are commercially available (both in hardware form and in software) and their use is currently widespread. Commercially available software and hardware can convert voice messages to text. Such systems are typically fine-tuned to the voice characteristics of the specific operator through a training regiment, in a noise free environment, that may last for an extended period. An example of such a training regime is that the computer instructs the operator to eliminate all noise sources and then displays a paragraph of text and the operator is asked to read the text. When certain words are not recognized, the computer instructs the operator to repeat those words over and over again and upon multiple failures the computer instructs the operator to move to a quiet environment and try again. Thus, the computer is optimized for specific voice characteristics in a quiet environment.

Referring to the example embodiments illustrated herein, FIG. 1 shows an example embodiment of a device 10 being used by an operator 20 to perform a vibration-based diagnostic test (hereinafter simply "test") at a specific location 30 on a machine 40. As shown in FIG. 1, the device 10 comprises a data acquisition unit 12, generally worn by the operator on a belt or in another manner that does not require the operator 20 to employ a hand in holding the unit 12; a headset 14 with earpiece 15 and microphone 16; a sensor 18; and a control unit 19 for displaying information and for receiving manual commands from the operator 20.

Figure 2B:
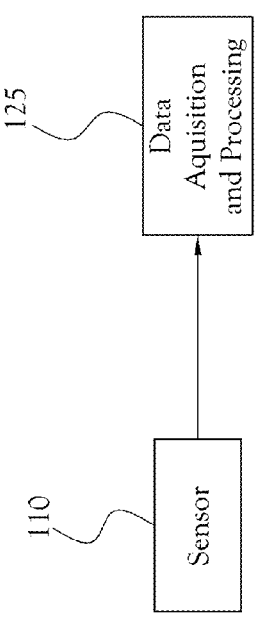
FIG. 2B is a block diagram illustrating a field inspection device according to another example embodiment of the present general inventive concept as a single unit instrument.

FIGS. 2A and 2B are simplified block diagrams illustrating devices configured in accordance with example embodiments of the present general inventive concept. In FIG. 2A, a device according to the present general inventive concept comprises a sensor 110 to gather vibration data from a machine; a data acquisition unit 120 to receive vibration data from said sensor 110, said data acquisition unit 120 being in communication with the sensor 110; and a controller/processor 130 to receive and process vibration data from said data acquisition unit 120. In FIG. 2B, a device according to the present general inventive concept comprises a sensor 110 and a component 125 that combines the data acquisition and data processing functions. It should be noted that these illustrated example embodiments are not exhaustive of the present general inventive concept.

Figure 3:
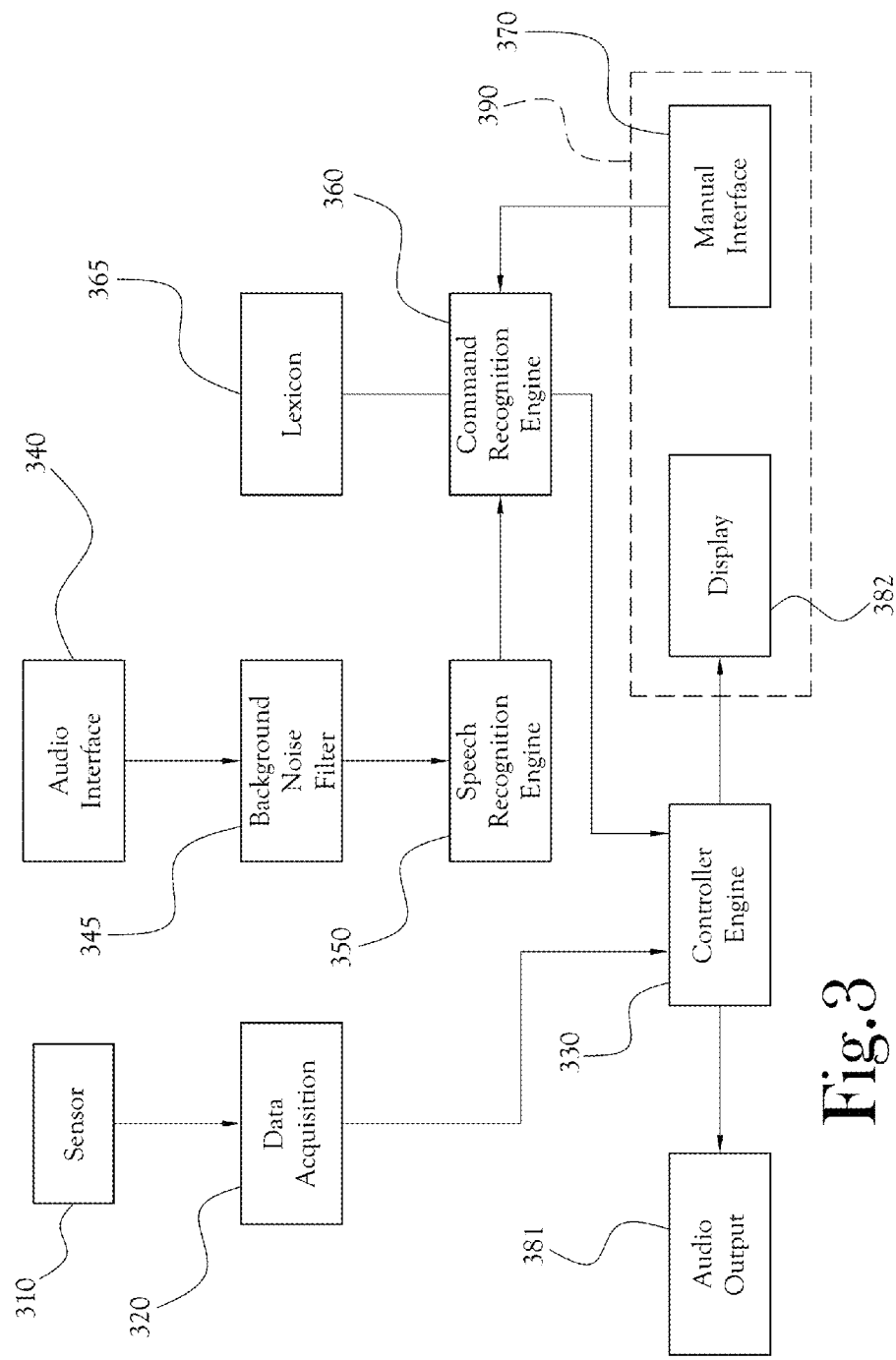
FIG. 3 is a block diagram illustrating components of a field inspection device according to an example embodiment of the present general inventive concept.

FIG. 3 is a block diagram of an example embodiment of a device according to the present general inventive concept. In FIG. 3, the illustrated example device comprises a sensor 310 to gather vibration data from a machine. Vibration data from the sensor 310 is passed to a data acquisition unit 320, which in turn passes the vibration data on to a controller engine 330. The controller engine 330 also receives commands and input from an operator using the device. Generally, verbal commands and other verbal input enter the device through an audio interface 340. From the audio interface 340, which in some embodiments is a microphone, and which in some embodiments is attached to a headset (as previously shown in FIG. 1), verbal commands and other verbal input pass to a speech recognition engine 350, which recognizes and processes verbal input. In many embodiments, the audio input from the audio interface 340 is processed through a background noise filter 345 to separate verbal input from the operator from background noise recorded by the audio interface 340. Additionally, the headset may provide hearing protection reducing the volume of the surrounding background noise thus enhancing the operator's ability to clearly distinguish the audio output feed to the speakers mounted in the earpieces. Verbal input recognized by the speech recognition engine may be limited to a subset of available commands to allow for improved discrimination of verbal commands in a noisy environment. Verbal input recognized and processed by the speech recognition engine 350 is passed along to a command recognition engine 360, which identifies those verbal input terms and phrases that correspond to recognized command terms and thereupon designates said identified verbal inputs as verbal commands. Generally, the command recognition engine 360 draws upon a lexicon 365 of recognized command terms kept by the program. Verbal commands pass from the command recognition engine 360 to the controller engine 330. As shown in FIG. 3, manual commands and other manual inputs are also delivered to the command recognition engine 360 by way of a manual interface 370, which in some embodiments takes the form of a touch screen or key pad. The controller engine 330 receives and processes vibration data, verbal commands, other verbal inputs, manual commands, and other manual inputs; the controller engine 330 then stores assembled data packets, as described, and in real time produces outputs, which are given to the operator either as audio outputs through an audio output unit 381 (which is some embodiments comprises one or more speakers in a headset, such as the headset 14 with earpiece 15 shown in FIG. 1) or as visual outputs through a display 382. In some embodiments, the display 382 and the aforementioned manual interface 370 are both part of a single pad 390 or similar component. Other embodiments could utilize a virtual heads up display incorporated into the operator's safety helmet.

Figure 4:
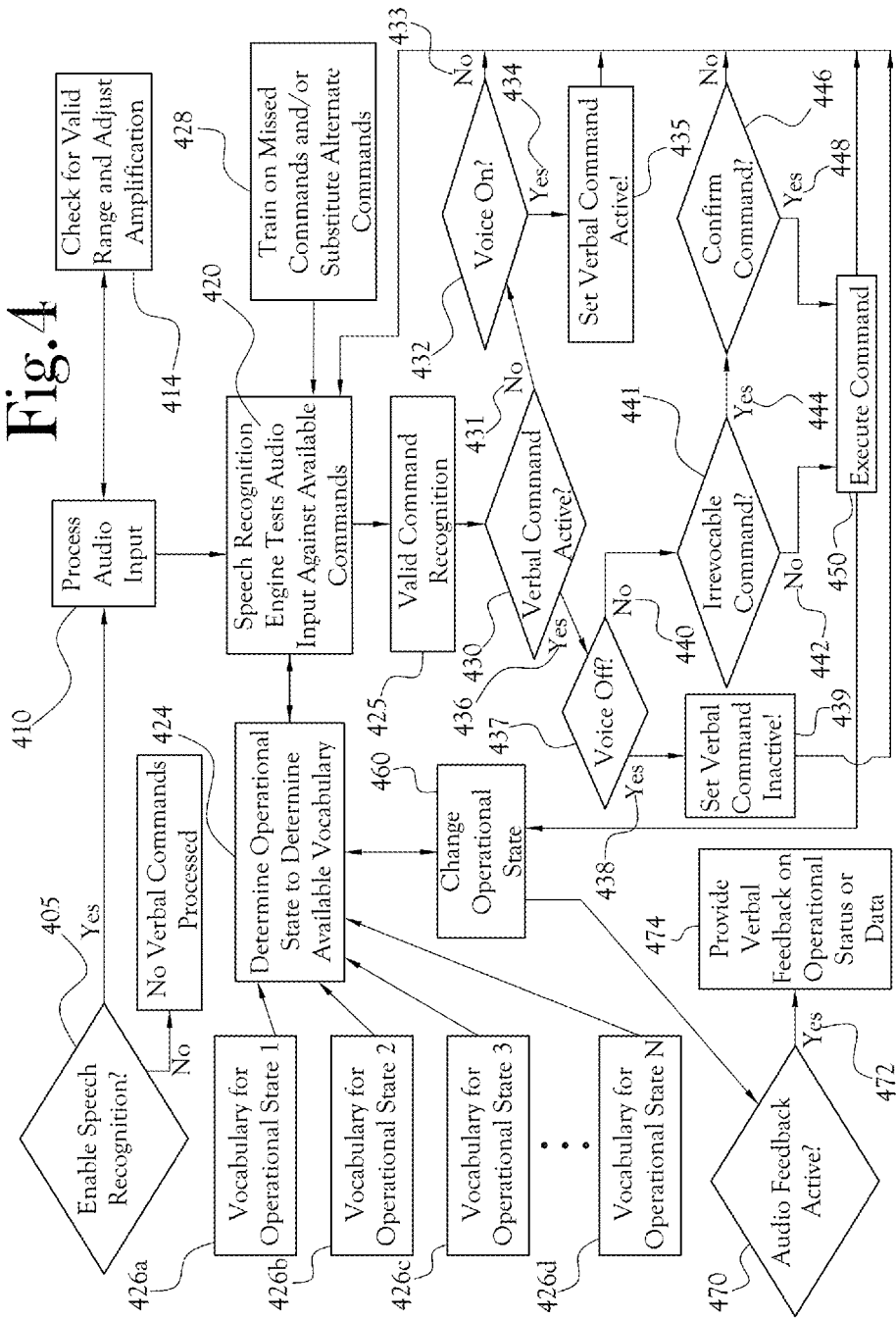
FIG. 4 is a flow diagram illustrating an example routine interpreting audio input from an operator according to an example embodiment of the present general inventive concept.

FIG. 4 is a flow diagram illustrating an example embodiment of a process by which the program recognizes and acts upon verbal commands. The use of the verbal command interface is turned on manually by checking the box by Enable Speech Recognition on the screen shown in FIG. 7. The verbal feedback function is enabled by checking the box by Enable Auditory Feedback. Either of these two functions can be enabled independently of the other. In many embodiments, an audio input is received by an audio input component of a verbal command control and audio feedback interface (hereinafter "the verbal interface"); the device includes verbal interface software that enables the verbal interface to process and respond to the audio input. Generally, the verbal interface will have two modes related to verbal commands: in a first mode, the "Verbal Commands Active" mode, the verbal interface is prepared to receive and process audio inputs; in a second mode, the "Verbal Commands Inactive" mode, the verbal interface will only process one command "Voice On" all other verbal commands are ignored. Recognition of the "Voice On" command will change the state of the engine to Verbal Commands Active. When in the Verbal Commands Active mode, the recognition of the "Voice Off" command will set the engine to the Verbal Command Inactive mode. This feature enables the verbal command control engine to be quickly disabled as needed under voice control to limit the possibility of false positive recognitions occurring if the operator needs to engage in an external conversation.

In some embodiments, the verbal interface software checks the received audio input 414 to determine whether the audio background signal level has changed significantly and the input amplifiers need to be readjusted. If the general level of background noise changes from location to location which occurs frequently in industrial facilities, then the audio content related to the operator's voice may be overwhelmed by the background noise and significantly impact the accuracy of the speech recognition engine. This adjustment of gain on the audio input amplifiers may be done automatically by software control or manually by the operator.

Figure 7:
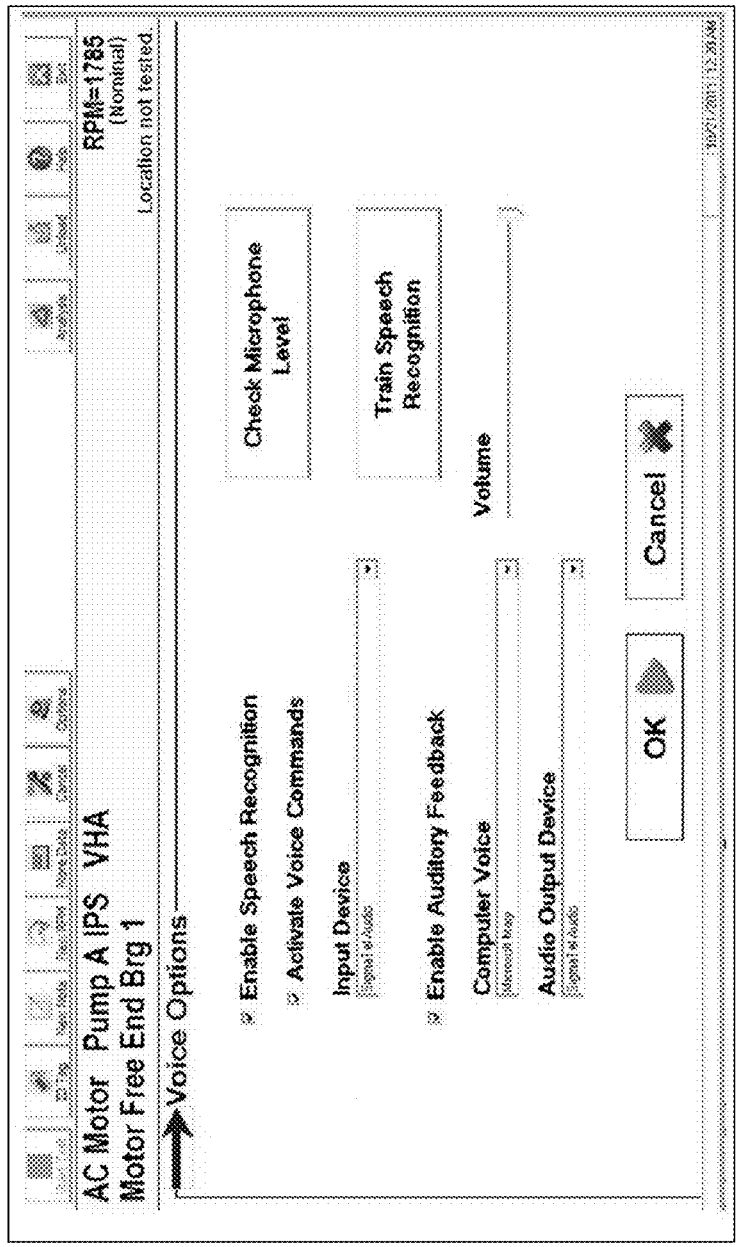
FIG. 7 illustrates another screen shot of a menu display according to an example embodiment of the present general inventive concept illustrating voice control options.

When the verbal interface is in the "Verbal Commands Active" mode 405, and the verbal interface receives the audio input 410, then the verbal interface passes the audio input on for further processing. Next, a speech recognition engine 420 tests the audio input against a list of available commands. Generally, the list of available commands that are valid at any given time depends upon the operational state of the instrument; therefore, the verbal interface software determines or takes note of the current operational state of the verbal interface 424 before drawing upon one of several stored vocabularies 426a-d. This process of limiting the lexicon of allowable commands greatly improves the accuracy of the recognition engine. If the audio input does not correspond to an available command from the vocabulary available in the present operational state, then the audio input is discarded and ignored. If verbal commands are not recognized at all or mistakenly recognized for another command, then the operator may correct this issue in the field by retraining the voice recognition engine 428. The Train Speech Recognition function shown in FIG. 7 provides access to this function which operates using the manual control interface. In some embodiments, the function may allow a user to select problematic commands from the appropriate vocabulary list and request that the operator repeat these words several times. The operator may then test the ability of the recognition engine to identify these commands. Optionally, the operator may select from list of available alternate command words or define his own words to substitute for the misrecognized commands. This may in some embodiments correspondingly adapt the visual interface. The modified command vocabulary may be personalized to a specific operator or made the default set for the instrument. Likewise the original default vocabulary may be reinstalled as needed. The accuracy of the recognition of the new vocabulary may be enhanced by repeating the training process.

If the speech recognition engine 420 matches the audio input against one of the available commands from the vocabulary available in the present operational state, then the verbal interface recognizes a valid command 425. The verbal interface software next determines whether the Verbal Commands setting 430 is active. If, when the verbal interface recognizes a valid command 425, the Verbal Command setting is not active 431, then verbal interface software determines whether the received valid command is a command to turn the Voice feature 432 to an "On" setting. If not 433, then the command is disregarded and discarded. If yes 434—i.e., the received valid command is in fact a command to turn the Voice feature 432 to an On setting—then the Verbal Command setting is set to "active" 435. If, when the verbal interface recognizes a valid command 425, the Verbal Command setting is active 436, then verbal interface software determines whether the received valid command is a command to turn the Voice feature 437 to an "Off" setting. If yes 438—i.e., the received valid command is in fact a command to turn the Voice feature 437 to an "Off" setting—then the Verbal Command setting is set to "inactive" 439. If not 440, then the command is passed along for further processing.

Next, the verbal interface software determines 441 whether the command is one of a list of "irrevocable commands" associated with the current operational state; examples of irrevocable commands in some operational states include, in some embodiments, "Overwrite Data" or "Exit." If the command is an irrevocable command 444, then the program will prompt 446 the operator for confirmation of the command, and only upon receiving confirmation 448 will the verbal interface software execute the command 450. If the command is not an irrevocable command 442, then the program will directly execute the verbal command 450. In some cases, the executed command 450 changes the operational state 460 of the device; this change in operational state 460, in some cases, alters the vocabulary of available commands recognized by the speech recognition engine 420, as explained above. Additionally, in some embodiments, the verbal interface includes an audio feedback component 470. If the audio feedback component 470 is active 472, then a change in operational state 460 generally triggers a verbal feedback message 474 to the operator, reporting audibly to the operator on the operational state of the instrument, the location on the measurement route, or on some aspect of the data collected by the device.

Figure 5:
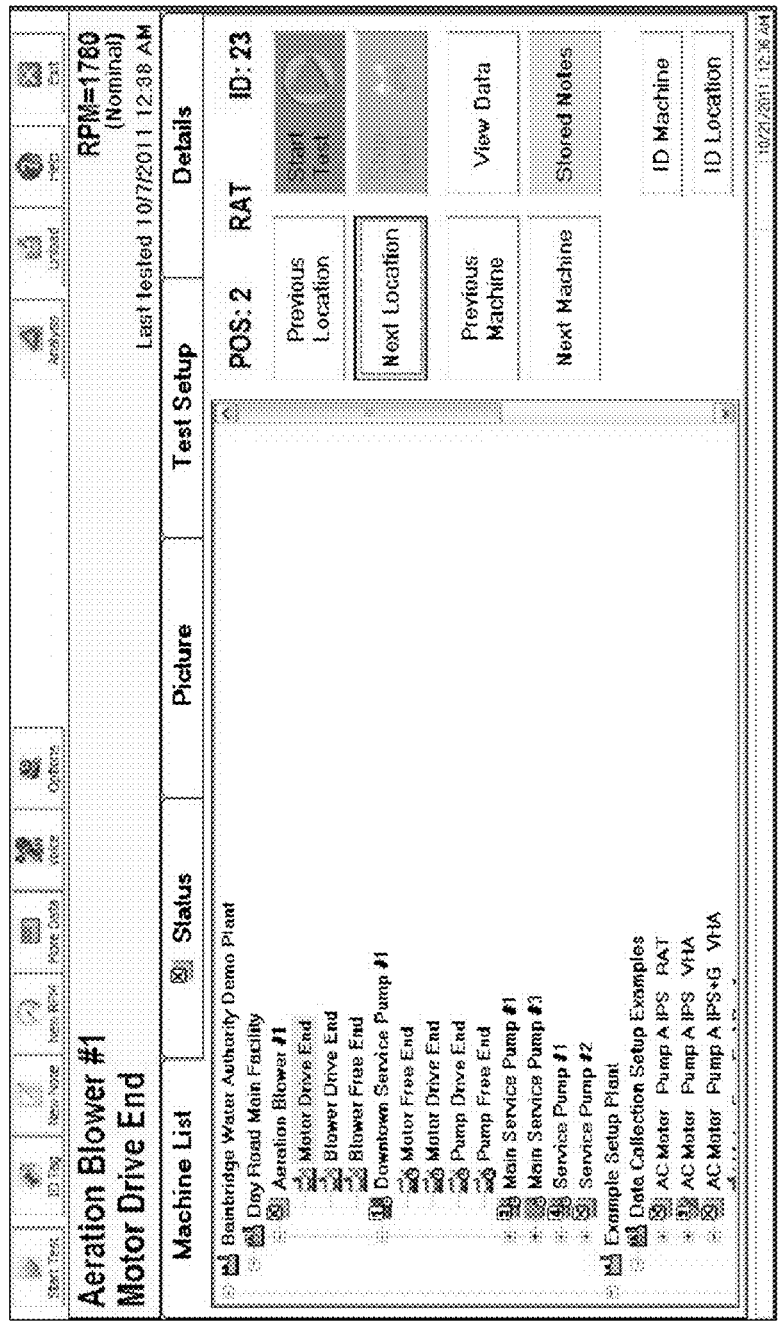
FIG. 5 illustrates a screen shot of a menu display according to an example embodiment of the present general inventive concept enabling navigation among a predefined list of machines.

FIG. 5 illustrates a screen shot of a menu display according to an example embodiment of the present general inventive concept. The image shown in FIG. 5 is similar to what would appear on the display screen of the pad 19 illustrated in the example embodiment in FIG. 1. At this menu level, an operator may select a different machine to inspect, or may select for inspection a different location on the machine that is currently selected. Also, at this menu level, an operator may start a diagnostic test or end a test. Generally, at this menu level, the program responds both to manual commands and to verbal commands. Within the context of this menu level, the range of verbal commands which the program will recognize and act upon is limited to a selected vocabulary, a "first menu select vocabulary." In some embodiments, examples of verbal commands included in this first menu select vocabulary include "Next Machine," "Previous Machine," "Next Location," "Previous Location," and "Start Test."

Figure 6:
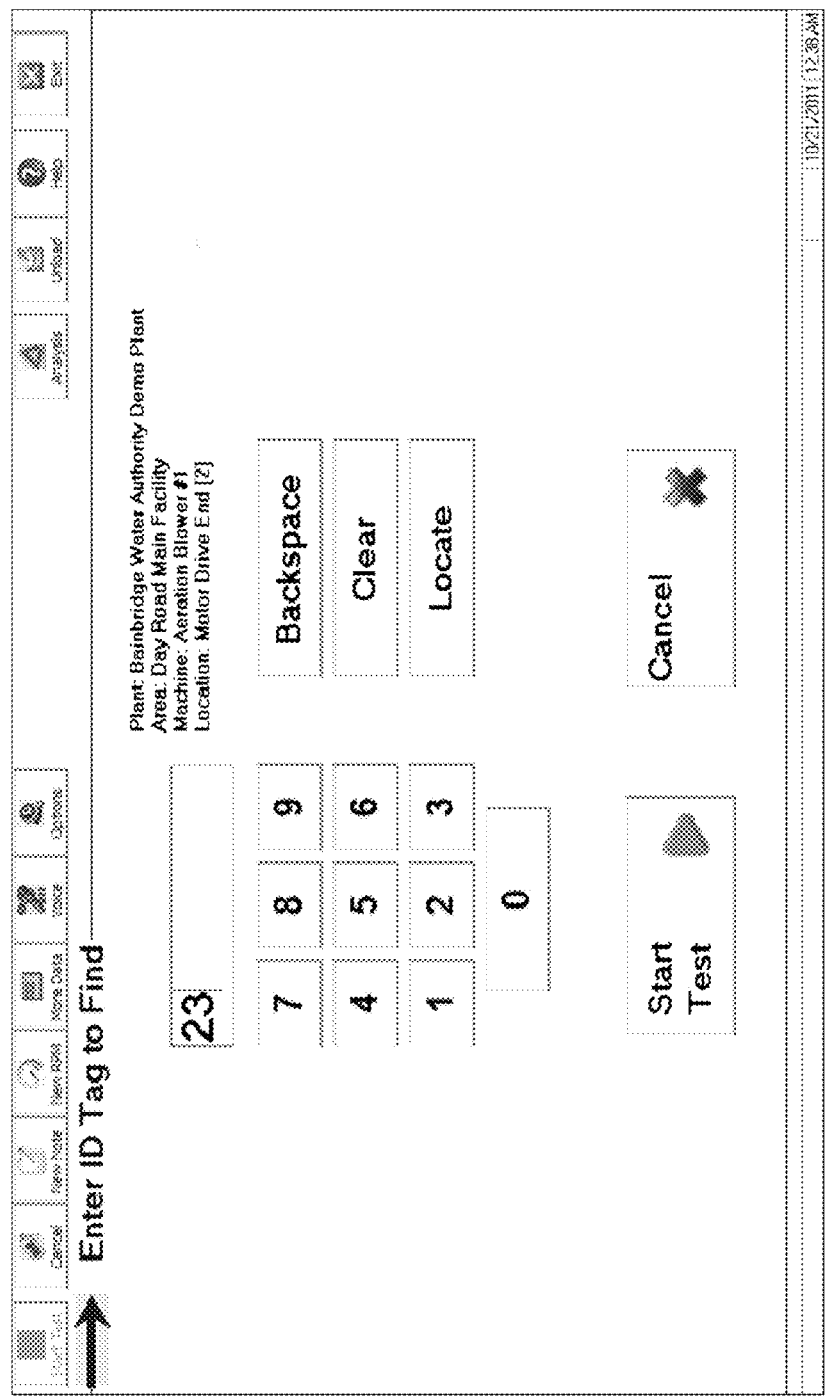
FIG. 6 illustrates a screen shot of a menu display according to an example embodiment of the present general inventive concept enabling navigation among a set of machines using ID tags.

FIG. 6 illustrates a screen shot of a menu display according to an example embodiment of the present general inventive concept illustrating an alternative method of navigation. In this operational mode, the operator types or electronically scans the ID tag at a measurement location; this ID tag (which in some embodiments includes a scannable bar-code or RFID tag) identifies the name of the location. In some embodiments, the operator verbally identifies the machine or machine location being evaluated by stating the name of the location or stating the ID number. In some embodiments, the device software audibly repeats the name of the location or machine currently selected by the operator to allow confirmation before data is collected. When confident that this is the desired location, the operator can initiate the test from this menu.

FIG. 7 illustrates a screen shot of a menu display according to an example embodiment of the present general inventive concept. At this menu level of FIG. 7, an operator may select various options for how the program receives voice commands and how the program communicates audio output to the operator. Generally, at this menu level, the program responds only to manual commands.

Figure 8:
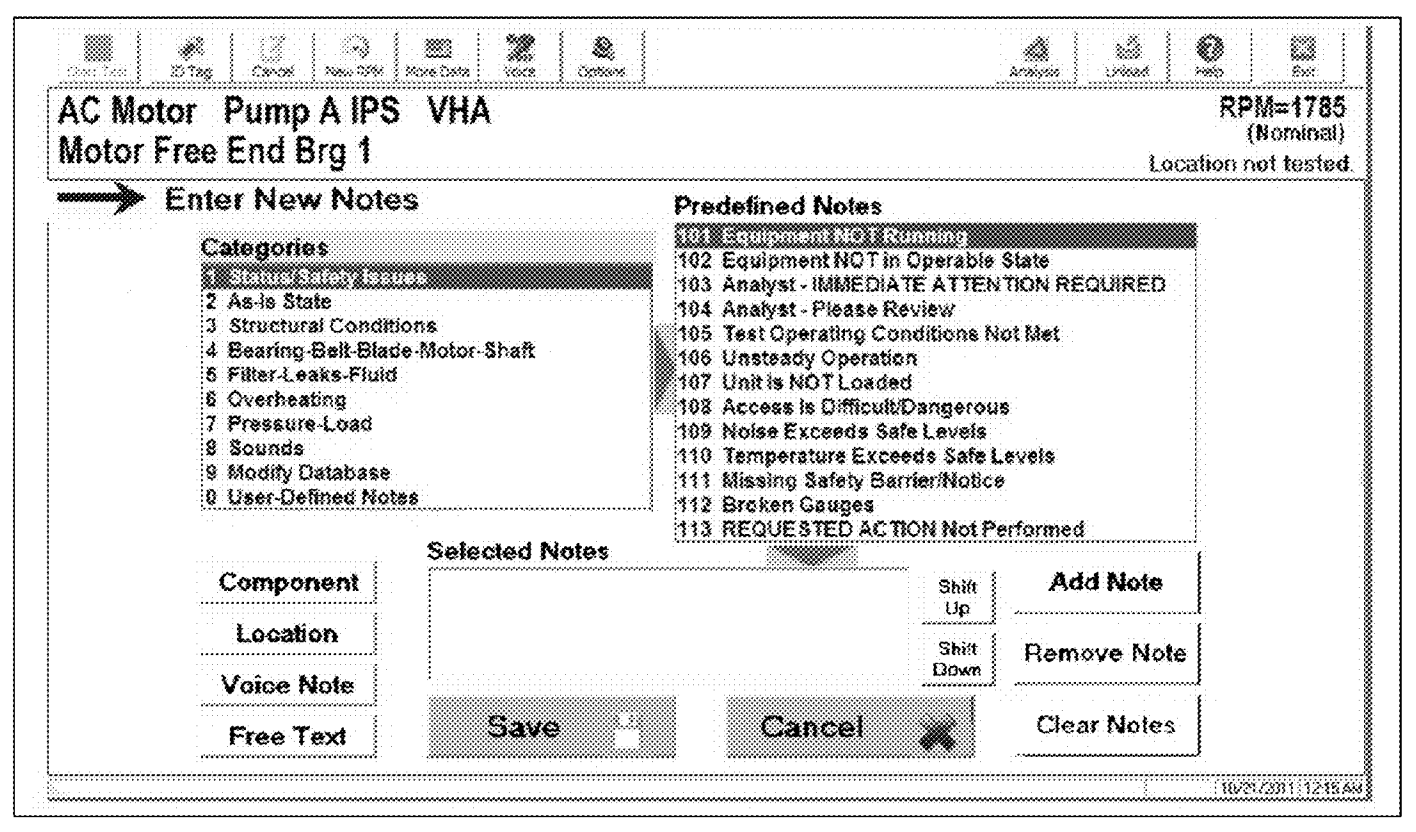

FIG. 8 illustrates a screen shot of a menu display according to an example embodiment of the present general inventive concept. This menu level corresponds to a position in the program where an operator may add notes related to the physical condition of the machine or related to the data collected for a selected location on a selected machine. At this menu level, the operator gives a first command (either as a verbal command or a manual command) to select an option from a first submenu. Generally, each first submenu option, when selected, calls forth a second submenu associated with that first submenu option. After selecting a first submenu option, the operator then gives a second command to select a second submenu option. In the illustrated embodiment, most of the second submenu options correspond to standard, pre-defined notations or comments. The presence of standard, pre-defined notations as submenu options permits the operator to use shorthand commands to quickly register common notations, such as "Analyst—Please Review," "Unsteady Operation," or "Noise Exceeds Safe Levels."

In order to accurately analyze the vibration data collected for a machine, it is critical to determine the speed accurately because the faults present in a machine are directly related to the machine speed. When the machine speed changes, the location of peaks in the frequency spectrum related to specific faults also changes. Since machine speeds vary depending upon operational conditions, it is important to be able to measure the machine speed if this information cannot be accurately determined from the vibration data.

Figure 9:
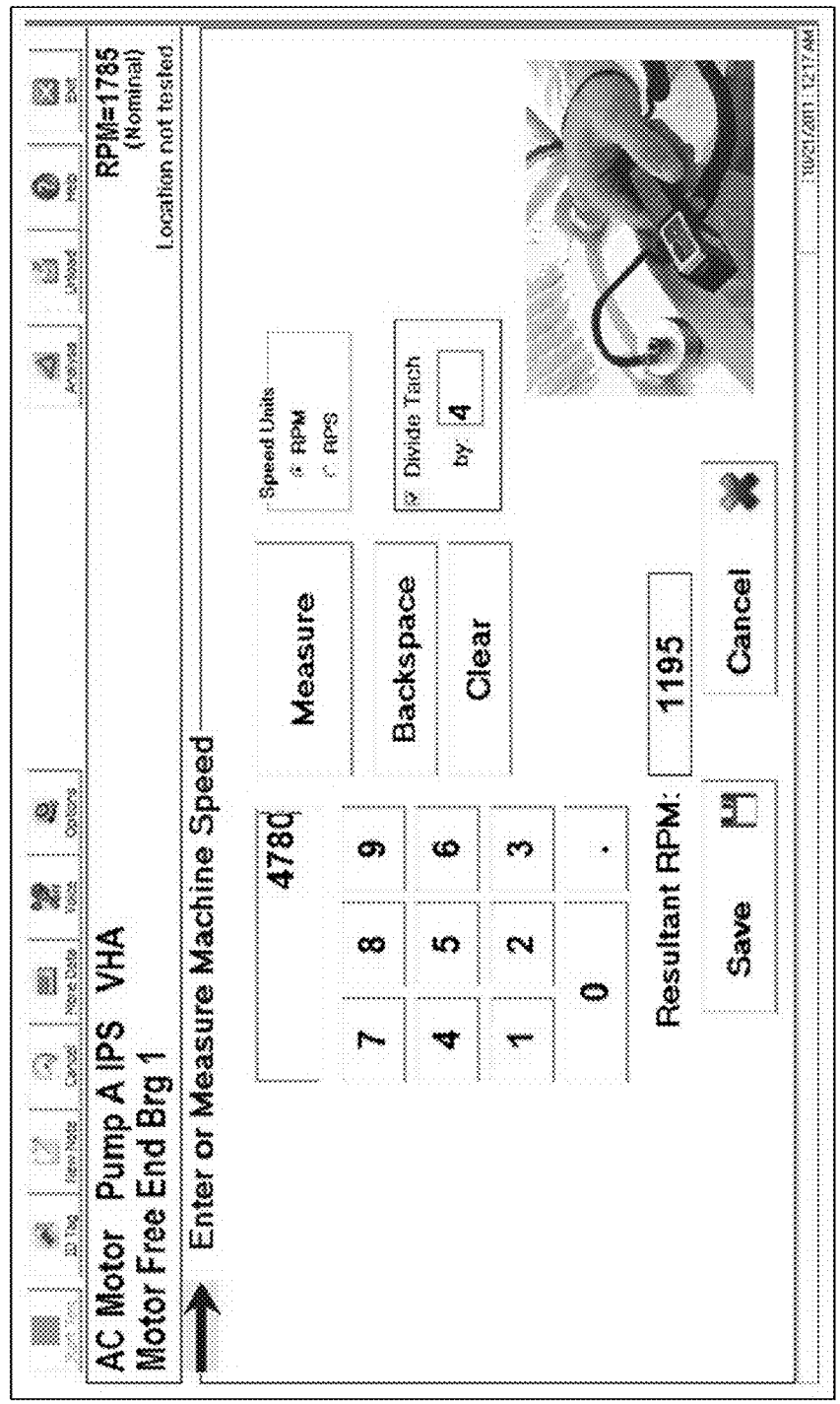
FIG. 9 illustrates another screen shot of a menu display according to an example embodiment of the present general inventive concept illustrating how the current operational state of the machine can be assessed by measuring its speed.

FIG. 9 illustrates a screen shot of a menu display representing an example embodiment of the present general inventive concept that illustrates how the current operational state of the machine can be determined by measuring its speed. This requires a tachometer with a visible or laser light beam that can be reflected off of the rotating assembly. This will result in one or more pulses being generated for every revolution of the machine. The time difference between these pulses can be used to determine the speed of rotation.

A typical set of data collected for one test location may include (i) low range spectra and waveforms on all three spatial axes with a maximum frequency of 10×RPM, (ii) high range spectra and waveforms on all three spatial axes with a maximum frequency of 100×RPM, (iii) demodulation spectrum and waveform on one spatial axis with a maximum frequency of 30×RPM, (iv) Overall velocity levels from 10-1000 Hz, and (v) 1× amplitude and phase measurements. In order to determine whether this collected data is of good quality, it is important to create data summaries which can be screened by the operator or automatically to uncover suspect conditions that might indicate the need to collect the data again or collect additional data.

Figure 10:
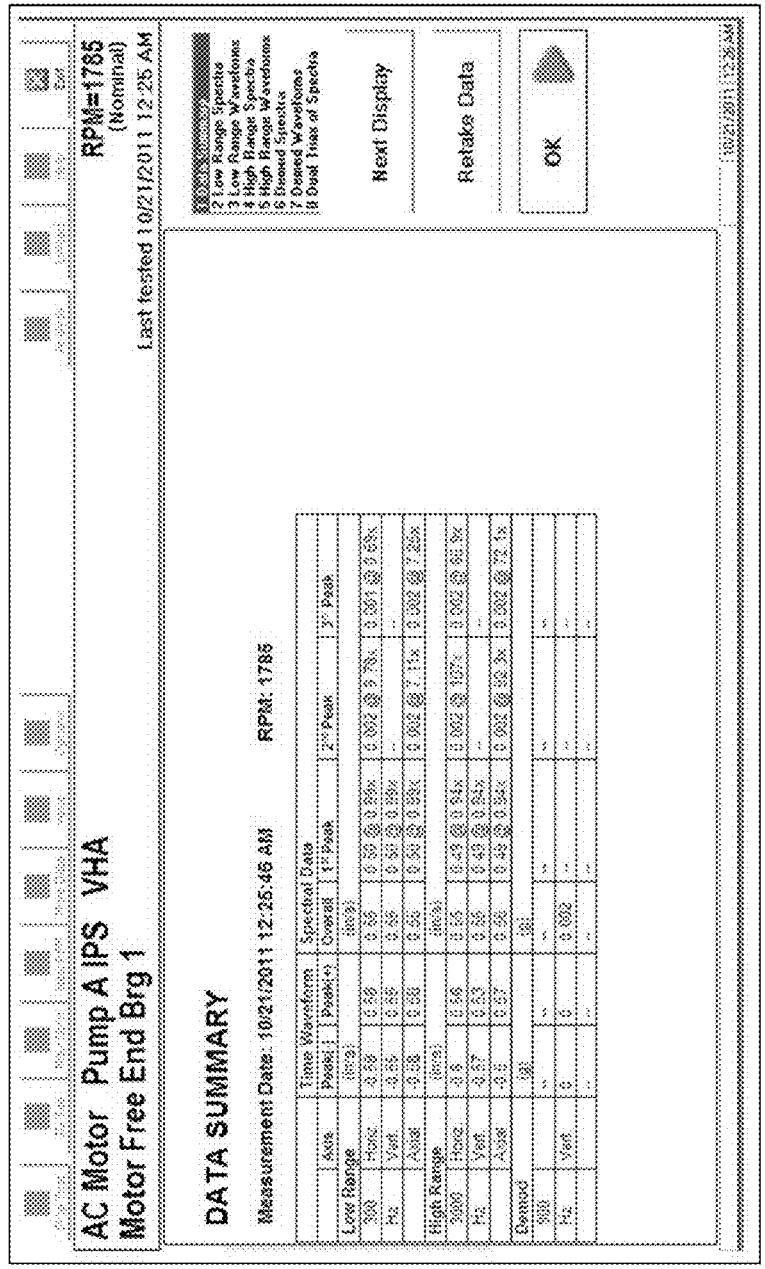
FIG. 10 illustrates another screen shot of a menu display according to an example embodiment of the present general inventive concept illustrating how the complete set of test measurements might be summarized as an aid to insuring the quality of the data that has been collected and evaluating the mechanical health of the machine-under-test.

FIG. 10 illustrates a screen shot of a menu display according to an example embodiment of the present general inventive concept illustrating how the complete set of test measurements might be summarized as an aid to evaluating the quality of the data that has been collected. During the collection process, the presence of sensor cable faults is automatically detected and these conditions reported to the operator, on the screen and verbally. It is important that quality checks of the data be performed automatically during and at the conclusion of data acquisition and that the operator be alerted, both visually and verbally, to the quality and character of the collected vibration data.

Figure 11:
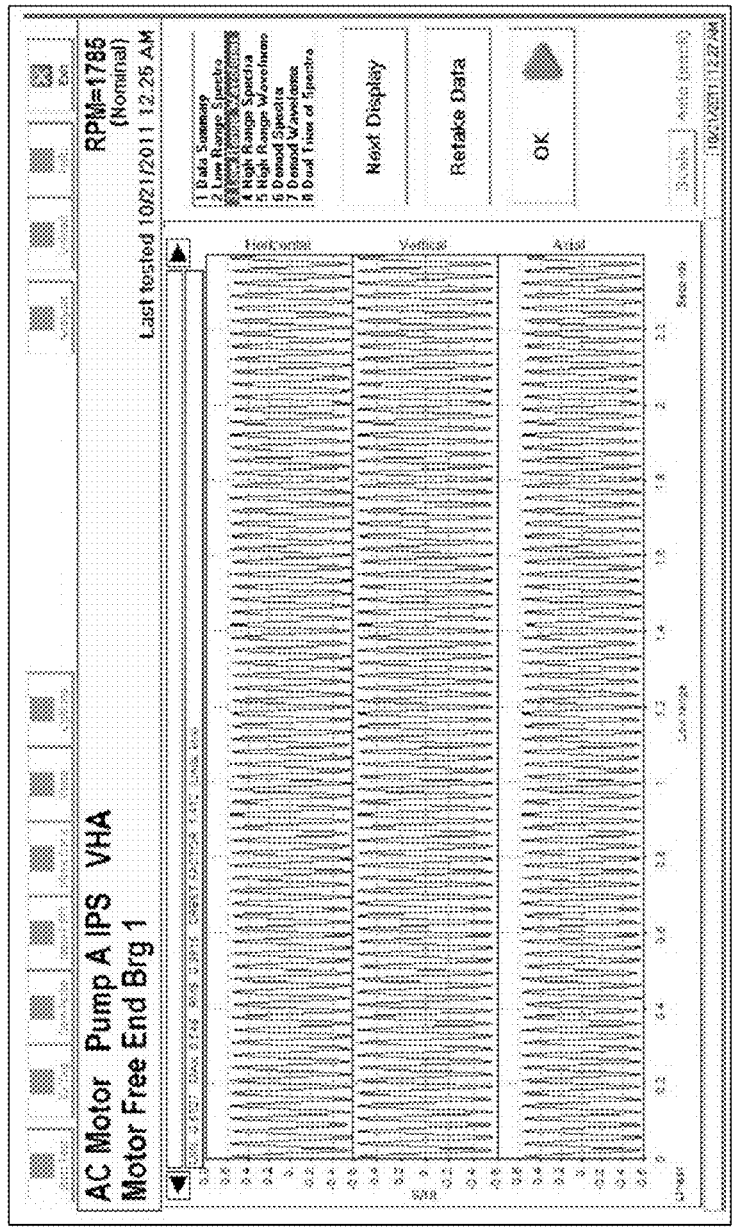
FIG. 11 illustrates another screen shot of a menu display according to an example embodiment of the present general inventive concept illustrating one of eight typical graphical presentations used to look for potential machinery faults.

A skilled operator may also want to review graphs of the collected data to review the quality of the data or to investigate possible machine faults. FIG. 11 illustrates a screen shot of a menu display according to an example embodiment of the present general inventive concept illustrating one of eight typical graphical presentations used to look for potential machinery faults.

A more sophisticated option for evaluating the collected data is the use of an expert system which mimics the behavior of a human analyst to review the collected data in the field to identify likely fault conditions, if present, and to evaluate their relative severity. The overall health status of the machine and any likely fault conditions are presented both visually and optionally as a verbal output.

Figure 12:
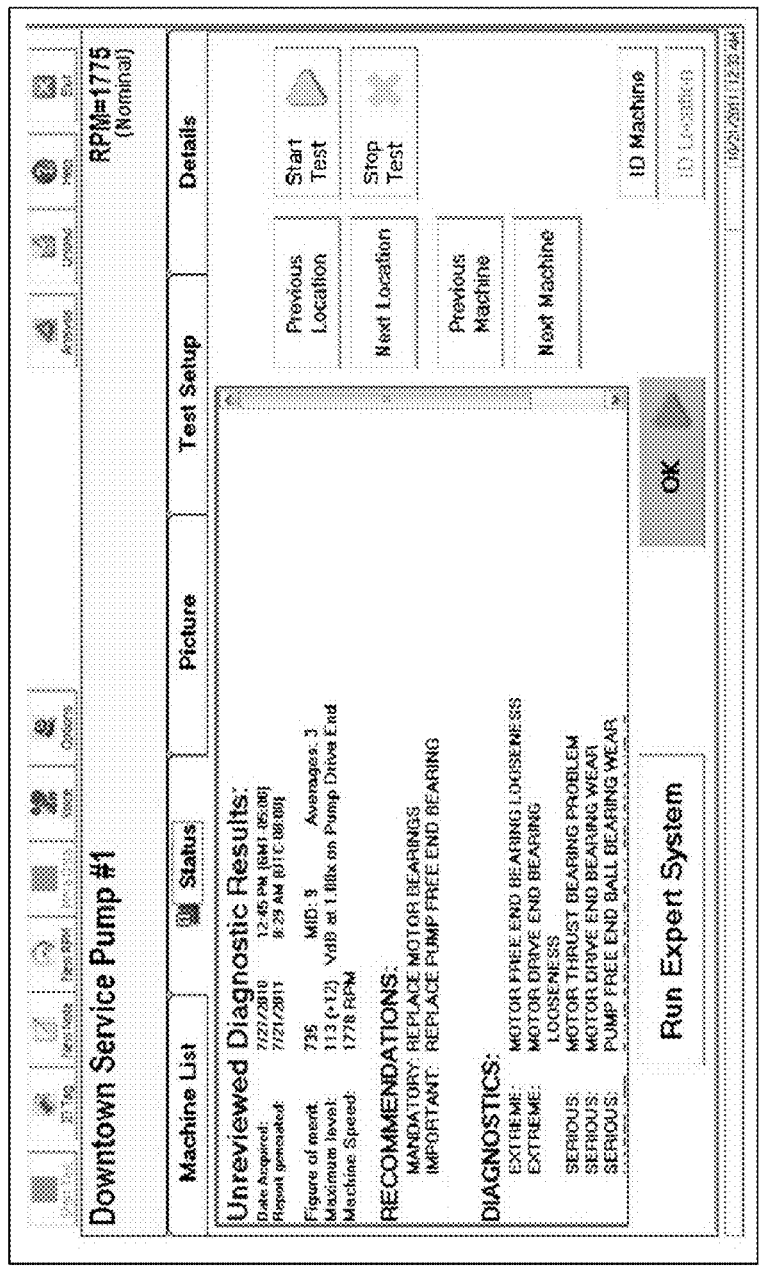
FIG. 12 illustrates another screen shot of a menu display according to an example embodiment of the present general inventive concept illustrating the result of applying an expert system to automatically screen the data to identify suspected faults present and their severity.

FIG. 12 illustrates a screen shot of a menu display according to an example embodiment of the present general inventive concept illustrating the result of applying an expert system to automatically screen the data to identify suspected faults present and their severity. Another optional output of such an expert system can be recommendations to collect additional data which may confirm or deny the existence of a suspected fault condition. No additional data is required for normal, healthy machines.

Figure 13:
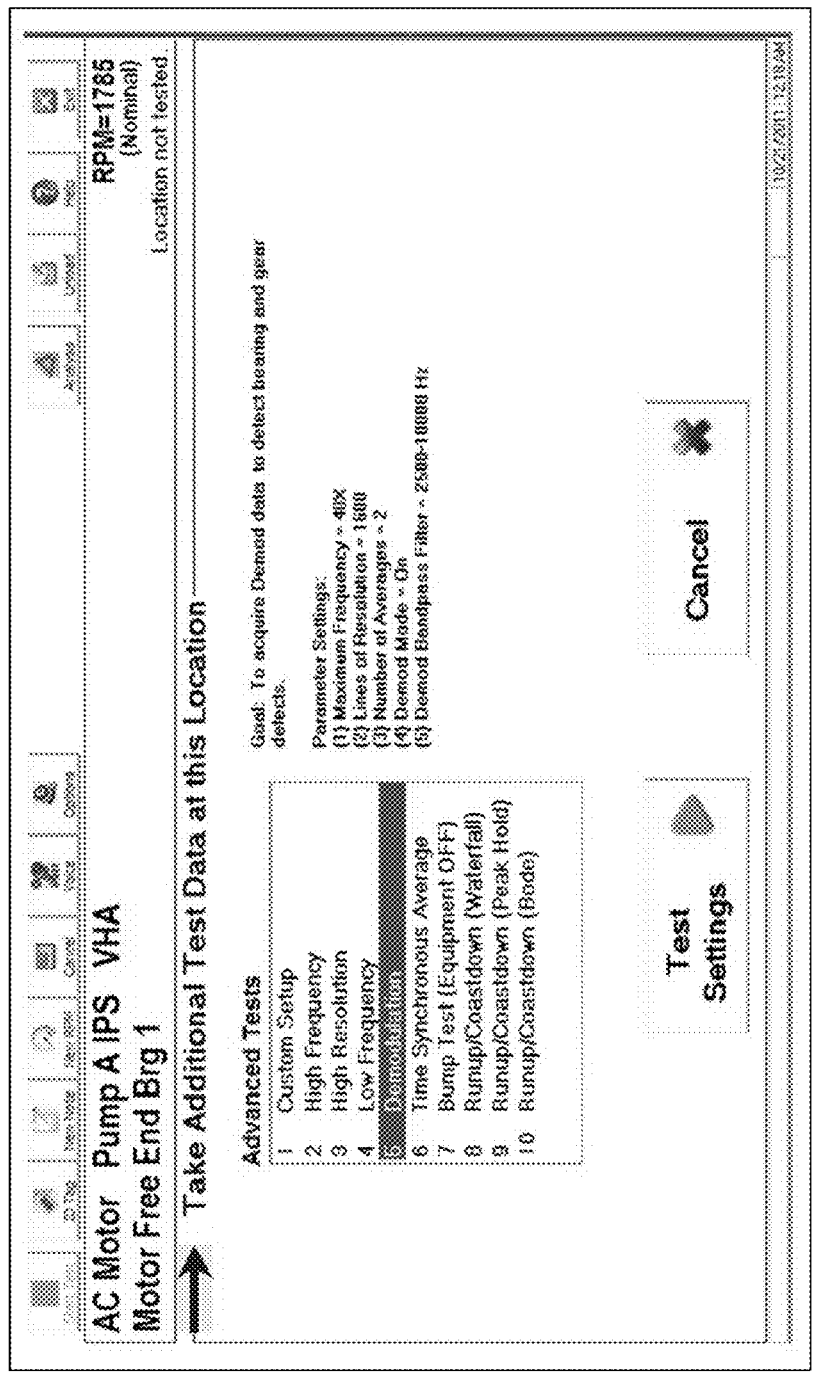
FIG. 13 illustrates another screen shot of a menu display according to an example embodiment of the present general inventive concept illustrating additional measurements that can be collected to attempt to confirm or eliminate suspected fault conditions.

There may be the need to collect additional data beyond that which has been predefined as the routine measurements to be collected. This may result from requests by the analyst or from the expert system or because of the operator's own judgment. There are literally hundreds of variations of measurement setups that could be selected as a result of the flexibility available in the instrument. In order to assist the operator in making certain measurements known to those skilled in the art to be valuable for evaluating specific machine conditions, a number of generic test types have been defined to facilitate their setup and execution. FIG. 13 illustrates a screen shot of a menu display according to an example embodiment of the present general inventive concept illustrating additional tests that can be performed to confirm or eliminate suspected fault conditions.

The successful application of speech recognition in this context of controlling the operation of a sophisticated measurement instrument in the presence of high levels of ambient noise with significant variations in its content with minimal training to adapt to the characteristics of the operator's voice is challenging. These challenges are overcome by removing complexity (1) reducing the number of actions needed to execute necessary instrument functions and (2) electing to use speech recognition techniques optimized to interpret a limited command vocabulary rather than the more complex tools of general speech-to-text translation. Control of routine instrument operation is implemented using a list of one-word or two-word commands; generally, the total number of commands needed to perform the various analyzer functions might consist of 100-200 word vocabulary. These commands must be meaningful to a wide audience of potential operators and must be verbally distinguishable from each other. The text for these spoken commands is generally displayed on corresponding controls on the controller screen. The ability of the speech recognition engine to distinguish between words could often be anticipated; however, the final selections were adjusted based on significant experimentation. Commands that could not be recognized reliably were excluded. Specific features have been incorporated into the design of the man-machine interface of the analyzer to make the "hands-free and eye-free" operation of the instrument possible. This discussion will focus on the mode where Speech Recognition and Auditory Feedback are enabled. The operator has immediate control of the speech recognition functions and can gate their operation with a "Voice On" or "Voice Off" command. These two commands are always active to quickly start or stop the instrument from listening and processing any other verbal commands. This feature is very important to allow the operator to communicate with someone other than the analyzer or when he may be in the presence of a conversation or other sounds which might be inadvertently processed by the instrument during intermittent periods where the instrument does not need to be listening.

To handle high and varying levels of ambient noise the microphone levels are monitored to allow automatic or manual adjustment of the input amplifiers in the field. To reduce the training requirements, the training is limited to the command vocabulary used by the instrument. This can be updated at any point in the field. Typically, recognition is good on most commands without any individual training. However, in the event that there are some commands that are not being recognized on a routine basis, the operator can quickly select those commands, repeat them in a learning mode and check the engines ability to successfully adapt to his voice. Again, this can be done quickly in the field environment and does not require a special quiet training environment. Another feature that has been incorporated to improve the reliability of command recognition is the ability to dynamically configure the instrument for alternate commands. Alternate command selections have been preconfigured but there is no technical limitation that would prevent operators from creating and saving their own alternatives that are peculiar to their own preference. The controller may record input and prompt the user for an intended command if recognition fails, then use this recording to train the speech recognition engine for the selected command.

For each control screen displayed by the instrument, the range of verbal commands which the program will recognize and act upon is limited to a subset of the total command vocabulary by instrument software. That is, each submenu has its own selected vocabulary, and terms that would be recognized as verbal commands in one submenu context would not be recognized as verbal commands in a different submenu context. Speech recognition of commands is improved as the number of command options decreases.

The ability of the instrument to provide verbal feedback is embodied in standard Text-To-Speech (TTS) functions available commercially. The challenge with implementing this feature in a manner that allows "Eyes-Free" operation for the routine tasks of data collection is two-fold. Firstly, the instrument must produce information that is informative and timely without overburdening the operator's auditory channels. Secondly, the instrument must reduce the significance of large sets of complex data into a meaningful accurate description that removes the operator's need or desire to review a summary spreadsheet or graphical displays. This is accomplished by screening the data for deviant values of important signal characteristics and by the use of the expert system. Both of these methods prefer to draw on historical baseline data or statistics to determine deviant behavior. If historical data is absent, the techniques employed use knowledge of the machine design to synthesize baseline comparison values.

A device according to the present general inventive concept, by enabling voice entry of commands, frees the inspector to move around and focus his/her attention on the machine being tested without needing to manually interface with the device to input commands. A background noise filter improves the use of such a voice-controlled device in noisy environments. Voice control of the device allows an operator to input commands and enter notations while leaving both of the operator's hands free to engage in other activities, such as clutching a ladder or repositioning the sensor. Voice control of the device is thus safer than systems that rely upon manual input of commands.

Still other embodiments will become readily apparent to those skilled in this art from reading the above-recited detailed description in view of all the drawings and figures.

The present general inventive concept may be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

It is noted that the simplified diagrams and drawings do not illustrate all the various connections and assemblies of the various components, however, those skilled in the art will understand how to implement such connections and assemblies, based on the illustrated components, figures, and descriptions provided herein.

It is also noted that numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. A portable, voice-controlled vibration data analyzer system configured to be carried by a user to detect vibration data from one or more vibration sensors coupled to one or more machines-under-test in a machine testing environment, the portable voice controlled system comprising:

a headset including an audio interface configured to receive verbal input from a user and to output verbal feedback to the user while vibration data is being detected from a vibration sensor, the verbal input including observation data from the user characterizing observed conditions of a particular machine-under-test, the headset being configured to suppress background noise to provide hearing protection and to separate the verbal input of the operator from the background noise;

a data acquisition unit to receive detected vibration data from the one or more vibration sensors;

a control unit in electronic communication with the vibration sensor, headset, and data acquisition unit, the control unit having a user interface to receive manual input from the user and to output visual feedback to the user via a visual interface, the control unit being configured to execute commands in response to manual or verbal input, the commands being configured to instruct the data acquisition unit to receive vibration data from the vibration sensor and to instruct the audio and visual interfaces to respectively output audio and visual messages relating to the detected vibration data, the control unit being further configured to process the vibration data into assembled data packets comprising a collected set of vibration data, observation data, and information identifying a measurement location of the detected vibration data, and to selectively output verbal and visual feedback data to the audio and visual interfaces, respectively, based on the data packets, while vibration data is being detected, the control unit comprising:

a command recognition engine configured to store a plurality of available verbal commands corresponding to a plurality of operational states of the system such that one or more verbal commands that would be available in one operational state are not available in a different operational state where only those commands that are predetermined to be reliable in a particular machine testing environment defined by varying levels and frequencies of ambient noise are included in the plurality of available verbal commands;

a speech recognition engine configured to test received verbal input against available verbal commands of a particular operational state, and to determine if the received verbal input is recognized as a valid verbal command; and a training module configured such that the user can select via the audio or visual interface to (i) choose from a list of alternative available commands that are predetermined to be reliable in the particular machine testing environment, or (ii) define a substitute command, when a particular verbal input is not recognized as an available command, and to selectively store the substitute command personalized to a specific user, dynamically modifying the visual interface to reflect the changes in the command syntax.

2. The voice-controlled vibration data analyzer of claim 1, wherein the control unit executes commands in response to the manual or verbal input to locate a particular machine and measurement location using identification (ID) tag numbers, to enter or measure a predetermined operational parameter of the machine-under-test, and/or to take a photograph, audio recording, and/or visual recording of the machine-under-test or operating environment thereof.

3. The voice-controlled vibration data analyzer of claim 1, further comprising an automated analysis system selectable by the user via the user interface, the automated analysis system being configured to compare the detected vibration data against baseline values corresponding to the particular machine-under-test based on deviations of the detected vibration data against the baseline values, and provide visual and verbal output indicating the severity of the measured deviations.

4. The voice-controlled vibration data analyzer of claim 3, wherein the automated analysis module in the control unit is configured as an expert system to review the detected vibration values corresponding to the particular machine-under-test such that the expert system identifies a suspected fault condition based on deviations of the detected vibration data against the baseline values, and identifies one or more most likely faults, their respective severities, and recommended actions using both audible and visual outputs as feedback to the operator.

5. The voice-controlled vibration data analyzer of claim 4, wherein the expert system is configured to suggest one or more additional data collection tests to verify the accuracy of an analysis from among a plurality of different measurement collection setups based on the suspected fault condition.

6. The voice-controlled vibration data analyzer of claim 1, wherein the control unit and the data acquisition unit are formed as a separate unit.

7. A portable, voice-controlled vibration data analyzer configured to be carried by a user to detect vibration data from a vibration sensor coupled to a machine-under-test, the analyzer comprising:

a data acquisition unit to receive detected vibration data from the vibration sensor; and a control module having a touch-visual user interface to receive and display information relating to machine conditions, and an audio user interface to receive and communicate information relating to machine conditions such that the control module controls operation of both user interfaces simultaneously to execute commands to be performed by the data acquisition unit in response to an audio input to the audio user interface without a manual input to the touch-visual user interface, to locate a desired machine among multiple machines along a predetermined collection route, to enable predefined and elective modes of data collection, to log results from a user relating to physical observations of the machine-under-test into observation data, and to determine whether additional measurements are needed and whether to collect additional vibration data, the control unit being configured to process vibration data into assembled data packets including one or more of a collected set of vibration data, observation data, and information identifying a measurement location of the machine-under-test, and to selectively output verbal and visual feedback data to the audio and visual interfaces, respectively, based on the data packets;

wherein the control module includes a training module configured such that the user can select via the audio user interface or touch-visual user interface to (i) choose from a list of alternative commands that are predetermined to be reliable in the particular machine testing environment, or (ii) define a substitute command, when a particular verbal input is not recognized as an available command, and to selectively store the substitute command personalized to a specific user; dynamically modifying the touch-visual interface to reflect the changes in the command syntax.

8. The vibration data analyzer of claim 7, further comprising a wired or wireless headset including an audio interface configured to receive verbal input from a user and to output verbal feedback to the user, the headset being configured to suppress background noise to provide hearing protection and to selectively differentiate the verbal input of the operator from the varying frequencies and amplitudes of the noise sources emanating from different locations in the test environment.

9. The voice-controlled vibration data analyzer of claim 7, wherein the audio user interface is configured to receive verbal input from the user, including verbal instructions and verbal notations from the operator.

10. The voice-controlled vibration data analyzer of claim 9, wherein the touch-visual interface is configured to receive manual instructions from the user and to display information relating to the health of the machine-under-test.

11. The voice-controlled vibration data analyzer of claim 10, wherein the vibration sensor is configured to interact with the machine-under-test in order to gather the vibration data relative to the machine-under-test, the vibration sensor being connected to the data acquisition unit by wire.

12. The voice-controlled vibration data analyzer of claim 7, wherein the control module includes:

a speech recognition engine to accept and recognize a voice input and to filter the voice input from other noise signals received by the audio user interface;

a command recognition engine to accept and recognize verbal instructions and manual instructions respectively via the audio user interface and touch-visual user interface, the command recognition engine comparing verbal input to a lexicon of known verbal instruction terms and to designate a verbal input as a verbal instruction when the verbal input corresponds to one of the known verbal instruction terms; and a controller engine to control the collection of data, the display of data, the evaluation of the quality of the data and the health of the machine-under-test, the communication of data and machine-under-test status, the selection of operational modes, in response to the verbal instructions, and the selection of active lexicon commands depending on the operational state.

13. A method of collecting vibration data from a machine-under-test using the vibration data analyzer of claim 7, the method comprising:
inputting a first verbal command from a user to the control module to instruct the data acquisition unit to receive vibration data from the vibration sensor, without the user manually touching the control unit;
outputting an audio message from the control module to the user to communicate information relating to received vibration data, without the user having to visualize the control module; and
inputting a second verbal command from the user to the control module to instruct the control module to output an audio message relating to a navigation path of multiple machines to be tested, and to record an audible observation from the user about a condition of the machine-under-test.

14. The voice-controlled vibration data analyzer of claim 7, wherein the control module includes a speech recognition engine configured to test received verbal input against available verbal commands of a particular operational state, and to determine if the received verbal input is recognized as a valid verbal command, to record verbal input regarding a variety of observed physical conditions and identify the mechanical component and the specific location of the observed conditions using simple one or two word commands.

15. The voice-controlled vibration data analyzer of claim 14, wherein the verbal commands control the acquisition of audio and photographic recordings to document observed conditions.

16. The voice-controlled vibration data analyzer of claim 7, wherein the control module includes an automated analysis system selectable by the user via the audio user interface or touch-visual user interface, the automated analysis system being configured to compare the detected vibration data against baseline values corresponding to the particular machine-under-test based on deviations of the detected vibration data against the baseline values, and provide visual and verbal output indicating the severity of the measured deviations.

17. The voice-controlled vibration data analyzer of claim 7, wherein the automated analysis module in the control module is configured as an expert system to review the detected vibration values corresponding to the particular machine-under-test such that the expert system identifies a suspected fault condition based on deviations of the detected vibration data against the baseline values, and identifies one or more most likely faults, their respective severities, and recommended actions using both audible and visual outputs as feedback to the operator.

18. The voice-controlled vibration data analyzer of claim 17, wherein the expert system is configured to recommend one or more additional data collection tests to confirm or deny the existence of the suspected fault condition.

19. The voice-controlled vibration data analyzer of claim 7, wherein the control module is configured to selectively initiate audio and/or photographic recordings according to a command entered through the audio user interface or touch-visual user interface.

* * * * *